United States Patent Office 3,598,548
Patented Aug. 10, 1971

3,598,548
EXTRACTING SODIUM AND POTASSIUM FROM AQUEOUS SOLUTIONS HAVING A pH OF 14 USING UNHINDERED PHENOLS
Robert R. Grinstead, Walnut Creek, Calif., assignor to The Dow Chemical Company, Midland, Mich.
No Drawing. Filed Feb. 3, 1969, Ser. No. 796,161
Int. Cl. B01d *11/04;* C01d *1/04, 1/34*
U.S. Cl. 23—312                                  6 Claims

ABSTRACT OF THE DISCLOSURE

The disclosure concerns a novel process for producing purified aqueous solutions of sodium or potassium hydroxide from impure aqueous solutions of the bases. The process comprises contacting an aqueous solution of sodium or potassium values with a pH of 12 or above with a water-immiscible organic liquid comprising an unhindered phenol and an organic carrier liquid. The resulting two phase system is separated into the component aqueous and organic phases and the organic phase is contacted with water to yield the hydroxide solution.

BACKGROUND OF THE INVENTION

Heretofore aqueous solutions of cesium values have been obtained by selective extraction of cesium from aqueous solutions of cesium also comprising rubidium and/or potassium ions. The aqueous solution is contacted with a water-immiscible organic phase containing a "hindered" phenol and an organic carrier liquid. Upon contact, the cesium phenolate is preferentially formed, and when the organic and aqueous phases are separated, the cesium phenolate remains in the organic phase while the rubidium and/or potassium remain largely in the aqueous raffinate. The "loaded" organic phase is generally contacted with an aqueous acid and a purified aqueous solution of the corresponding cesium salt results.

The phenols which have been described for cesium recovery from aqueous solutions are "hindered." That is, they are substituted in the ortho position, i.e., in two and/or six positions on the phenol nucleus. Hindered phenols are also described where, in addition to ortho substitution, there is substitution at intermediate positions, and especially at the para position. The substituent groups are generally alkyl or halogen.

In attempting to extract sodium and/or potassium cations from aqueous hydroxide solutions; the hindered phenols are relatively inefficient. Unexpectedly it has been discovered that efficient extraction of sodium and potassium cations can be obtained where the phenols employed are "unhindered," i.e., where a benzene derived phenol is not substituted in either of the 2 or 6 ortho positions, but is substituted instead in at least one of the remaining positions on the phenol nucleus.

An outstanding advantage of the present process by comparison with prior art processes is that purified aqueous solutions of sodium hydroxide containing considerably reduced amounts of chloride, chlorate, sulfate, iron and other impurities can be produced directly from crude hydroxide solutions obtained in the commercial electrolysis of brines and inherently containing impurities of the type listed.

SUMMARY OF THE INVENTION

One embodiment of the present invention is the process comprising contacting an aqueous phase with a pH of at least 11 and containing potassium or sodium cations and impurities such as chlorate, chloride, and sulfate anions, and iron (e.g., effluent from electrolytic cells), with a water immiscible organic phase. This initial contacting is sometimes hereinafter referred to as the extraction step. The organic phase is characterized as comprising an unhindered phenol and a water-immiscible organic carrier liquid. Following the extraction step, the phases are separated and the organic phase is contacted with water to form a purified solution of sodium or potassium hydroxide. This latter contacting step is sometimes referred to hereinafter, as the stripping step. The resulting hydroxide solution is then separated from the sodium or potassium-depleted organic phase. If desired, the solid hydroxide can be isolated by evaporation of the water of the solution.

The temperatures of the organic phase and the sodium or potassium-containing aqueous phase during the extraction step are not crucial and can vary from about freezing point to the boiling point of the lower-boiling of the two phases. A preferred temperature range for good extraction efficiency during contacting is from about 20° C. to about 40° C.

The concentration of sodium or potassium cations in the aqueous phase is not critical, with the exeception that the pH of the aqueous phase must be at least 12. As Na$^\oplus$ and K$^\oplus$ concentrations increase, contact with a greater volume of the organic phase may be required to extract a given percentage of the sodium or potassium cations into the organic phase. The efficiency of extraction with the unhindered phenols is superior to the efficiency obtained with the hindered phenols.

During the extraction step, the relative volumes of the contacted phases can vary over a wide range. Efficient separations are obtained where the organic/aqueous ratio by volume of the contacted phases during extraction varies from 1:10 to about 100:1. An optimum ratio is 1:1 to about 5:1.

The time during which the phases are in contact is not crucial. Some extraction of the sodium or potassium cations will be obtained even though the phases are in contact only for a few seconds. As would be expected, the degree of extraction increases as the phases are allowed to remain in contact for longer periods of time. If contacting is carried out with agitation so that the phases become relatively and intimately dispersed within one another, extraction efficiency is increased, and contacting times can be reduced.

The concentration of the unhindered phenol in the extractive phase can vary depending on the extraction efficiency desired, the type of phenol employed and the conditions during the extraction step. If the concentration is high (in excess of about 2.5 molar) only a relatively small volume of organic phase may be sufficient. If the concentration is relatively low, a relatively large volume of organic phase may be necessary in order to extract all of the aqueous hydroxide.

Following the extraction step as described above, the cation-loaded organic phase is separated from the aqueous phase. As the phases are immiscible in one another, a two-layer system is readily obtained by allowing the phases to stand undisturbed after any agitation. The separation of the phases can then be perfected by commonly employed liquid-liquid separatory means.

Following phase separation the loaded organic phase is contacted with water to again form a two-phase system. Generally, the water acts to "strip" the potassium or sodium cations from the loaded organic phase. Therefore in contacting the water with the organic phase the two-phase system should be agitated so that the phases become intimately dispersed one within the other. The contact time will depend upon the extent of agitation, relative volumes of the phases, and the temperature of the phases. Generally an appreciable amount of cations will be stripped from the organic phase very soon after that phase is contacted and agitated with water.

The relative volumes of the two phases during "stripping" are not crucial, although it should be remembered that the concentration of the resulting aqueous hydroxide solution is inversely related to the volume of the aqueous stripping phase. Therefore, if a relatively concentrated solution is desired, the volume of the aqueous stripping phase should be decreased accordingly. If it is desired to obtain a sodium or potassium salt solution, the loaded organic phase can be stripped with an aqueous acid solution rather than water.

The temperature at which the stripping step is to be carried out can vary greatly. However, the degree of hydrolysis of the alkali metal phenolate in the loaded organic phase appears to be increased as the temperature is raised. Therefore optimum results can be obtained by "stripping" the loaded organic phase at higher temperatures than were employed in the extraction step. For most systems, a minimum stripping temperature of about 20° is advisable and greater stripping efficiency can be obtained by raising the temperature to about 65° C.

Unhindered phenols which can be employed must be soluble in a suitable carrier liquid and substantially insoluble in water. Likewise the sodium or potassium phenolate must exhibit similar solubility behavior. Suitable unhindered phenols (i.e., unsubstituted in either the 2 or 6 positions) contain at least 1 or 2 substituent groups. Illustrative substituent moieties are halogens and hydrocarbon species such as aryl, alkyl, alkaryl or aralkyl groups. The total number of carbon atoms in all substituent moieties is from 4 to about 3, with 8 to about 20 being the preferred total number of carbon atoms. Preferably each substituent has no more than about 12 carbon atom moieties. The $pK_a$ (acid dissociation constant) of suitable unhindered phenols falls within the range of 8 to 13 and preferably is from 9 to 11. An especially preferred class of unhindered phenols is the 3,5-dialkyl-substituted phenols possessing the above-defined characteristics. An example of this class is 3,5-di-tertbutylphenol

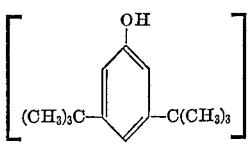

Other suitable unhindered phenols include m-pentadecyl phenol, 3-octyl, 4-chloro phenol, 3,4,5-tripropyl phenol, p-(1-butyl)hexyl phenol, and 3-methyl-4-isopropyl phenol.

Suitable organic carrier liquids are non-polar, relatively high-boiling, water-immiscible, liquids which are inert, especially under basic conditions. The carrier liquid must possess a sufficiently high boiling point, such as greater than about 50° C., and preferably greater than about 80° C., so that it is not unduly volatile under the temperature conditions employed in the extraction and stripping steps. Examples of carrier liquids are aromatic hydrocarbons such as benzene, toluene, xylene, and stilbene, or aliphatic [straight chain, branched or cyclic] hydrocarbons with at least 6 carbon atoms per molecule. Aliphatic and aromatic ethers with at least 6 carbon atoms can be employed. Chlorinated hydrocarbons such as carbon tetrachloride are also suitable carrier liquids. Other suitable carrier liquids are trichloroethylene, phenetole, cumene, diethyl benzene, anisole, cyclohexane, dioctyl ether, and a 40/60 by volume mixture of diphenyl oxide and hexane.

The following example is set forth to illustrate the invention.

EXAMPLE 1

In a specific embodiment of the invention, 1 molar solution of a hindered phenol (4-sec-butyl - 2 - (α-methylbenzyl)-phenol, hereinafter referred to as BAMBP) and an unhindered phenol, (3,5-di-t-butyl phenol) were prepared, using toluene as the organic carrier liquid.

Three different aqueous solutions of sodium hydroxide were prepared. The concentrations of the solutions were about 5.5, 2, and 3.9 molar.

The 5.5 molar hydroxide solution was divided into two portions. The first portion was contacted with an equal volume of toluene solution of BAMBP and the mixture was agitated. The other portion of the hydroxide solution was contacted with an equal volume of the toluene solution of the unhindered phenol. During contacting, the temperature of the solutions was about 25° C. Contacting was accompanied by moderate agitation, and total contacting time was about two minutes. Following contacting the solutions were separated and each phase was titrated to determine the concentration therein of sodium ion. The percentage of the phenol which reacted to form the phenolate was also determined in each instance.

In a manner similar to that described above, portions of the phenol solutions were also contacted with 2 and 3.9 molar solutions of sodium hydroxide. The results are set forth in Table I.

TABLE I

| Phenol in organic extractant phase | Conc. of aqueous phase before contact with organic phase, molar | Percent of phenol reacted | Concentration of sodium in phase after contacting and separation, molar | |
|---|---|---|---|---|
| | | | Organic phase | Aqueous phase |
| 3,5-di-t-butylphenol | 5.5 | 77 | 0.77 | 4.75 |
| Do | 3.9 | 60 | 0.60 | 3.34 |
| Do | 2 | 24 | 0.24 | 1.74 |
| BAMBP | 5.5 | 63 | 0.63 | 4.75 |
| BAMBP | 3.9 | 36 | 0.36 | 3.46 |
| BAMBP | 2 | 0.7 | 0.007 | 2.02 |

What is claimed is:
1. A process comprising:
(a) contacting an impure liquid aqueous phase having a pH of at least 14 and comprising a cation selected from potassium and sodium cations, with a water-immiscible organic extractant phase comprising an organic carrier liquid which is a non-polar relatively high boiling organic liquid, water-insoluble, inert and stable under basic conditions, and possesses a boiling point in excess of 50° C. and an unhindered phenol having a $pK_a$ of from 8 to 13, substantially water-insoluble, and which contains at least 1 substituent selected from the class consisting of halogen, aryl, alkyl, or aralkyl, said substituent groups containing a total of from about 4 to about 30 carbon atoms with not more than 12 carbon atoms being present in any one substituent group,
(b) separating the organic and aqueous phases,
(c) contacting the separated organic extractant phase with water thereby to produce an aqueous solution of sodium or potassium hydroxide.
2. A process as in claim 1 wherein the $pK_a$ of the unhindered phenol is within the range of 9 to 11.
3. A process as in claim 1 wherein the unhindered phenol is a 3,5-dialkyl substituted phenol.
4. A process as in claim 1 wherein the organic carrier liquid is a non-polar relatively high boiling organic liquid which is water-insoluble, inert, stable under basic conditions, and possesses a boiling point in excess of about 80° C.
5. A process as in claim 1 where the organic/aqueous ratio by volume of the phases contacted during the extraction step varies from 1:10 to 100:1.

6. A process as in claim 1 and including the additional step of separating the hydroxide from the organic phase as an aqueous solution.

References Cited

UNITED STATES PATENTS

| | | | |
|---|---|---|---|
| 3,179,503 | 4/1965 | Horner | 23—312 |
| 3,302,993 | 2/1967 | Bray | 23—312 |
| 3,305,321 | 2/1967 | Teumac | 23—339X |
| 3,415,746 | 12/1968 | Buetow | 23—312X |
| 3,433,583 | 3/1969 | Hess | 23—312X |

FOREIGN PATENTS

| | | | |
|---|---|---|---|
| 509,857 | 2/1955 | Canada | 23—312 |
| 1,013,473 | 12/1965 | Great Britain | 23—312 |

OTHER REFERENCES

O.R.N.L.–3627, October 1964, pp. 187–190, 195–203, 209.

Arnold et al. I. & E.C Process Design and Developer, vol. 4, #3, July 1965, pp. 249 to 254.

Horner et al., Nuclear Science and Engineering, vol. 17, #2, October 1963, pp. 234, 240–244.

WILBUR L. BASCOMB, JR., Primary Examiner

S. J. EMERY, Assistant Examiner

U.S. Cl. X.R.

23—184; 210—38; 260—624